(12) United States Patent
Liu

(10) Patent No.: US 7,088,890 B2
(45) Date of Patent: Aug. 8, 2006

(54) DUAL "CHEESE WEDGE" SILICON TAPER WAVEGUIDE

(75) Inventor: Ansheng Liu, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 79 days.

(21) Appl. No.: 11/001,551

(22) Filed: Nov. 30, 2004

(65) Prior Publication Data

US 2006/0115215 A1    Jun. 1, 2006

(51) Int. Cl.
*G02B 6/12* (2006.01)
(52) U.S. Cl. .................. 385/43; 385/129; 385/132
(58) Field of Classification Search .............. None
See application file for complete search history.

(56) References Cited

U.S. PATENT DOCUMENTS

| 6,108,478 | A | 8/2000 | Harpin et al. |
| 6,813,432 | B1 | 11/2004 | Salib |
| 2003/0007766 | A1* | 1/2003 | Galarza et al. ............. 385/132 |
| 2005/0008314 | A1* | 1/2005 | Drake .......................... 385/129 |

FOREIGN PATENT DOCUMENTS

JP          2005-43556    *  2/2005

OTHER PUBLICATIONS

Ozdal Boyraz, et al., "Self-Phase-Modulation Induced Spectral Broadening in Silicon Waveguides," Optics Express, Mar. 8, 2004, pp. 829-834, vol. 12, No. 5, Optical Society of America, USA.
Mike Salib, et al., "Silicon Photonics," Intel Technology Journal, May 10, 2004, pp. 143-160, vol. 08, Issue 02, ISSN 1535-864X, Intel Corporation, USA.

* cited by examiner

*Primary Examiner*—Frank G. Font
*Assistant Examiner*—James P. Hughes
(74) *Attorney, Agent, or Firm*—Kevin A. Reif

(57) ABSTRACT

An optical device may include a fiber or waveguide that is intended to be coupled to another waveguide having a significantly larger/smaller cross-sectional size. As such, two wedge shaped waveguides may be positioned atop a tapered waveguide. The dual wedge design may allow for shorter taper lengths and smaller final waveguide cross section dimensions.

20 Claims, 5 Drawing Sheets

Fig. 6A
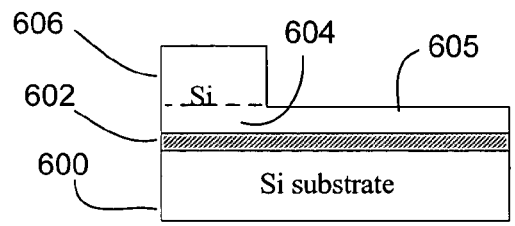
Fig. 6C
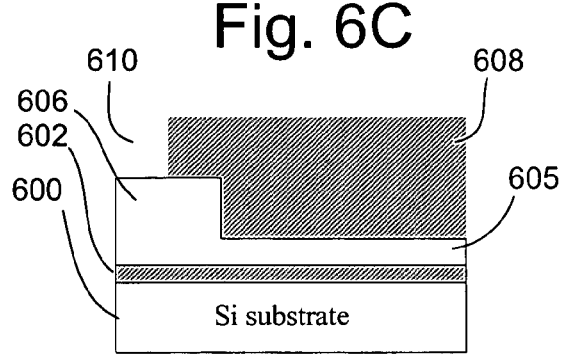
Fig. 6B
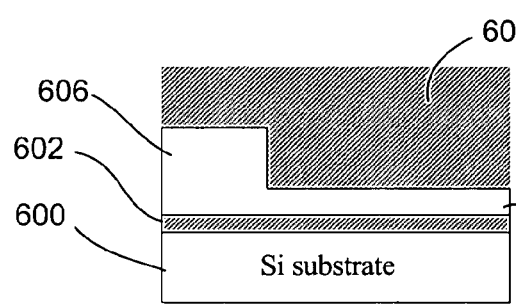
Fig. 6D
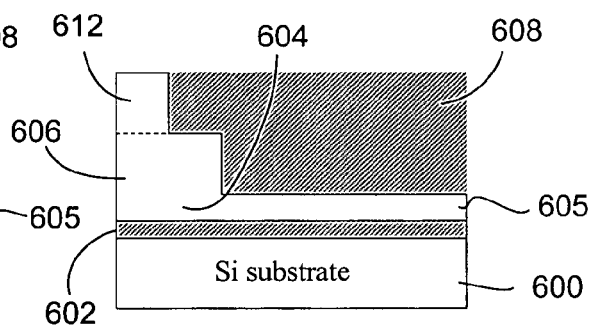
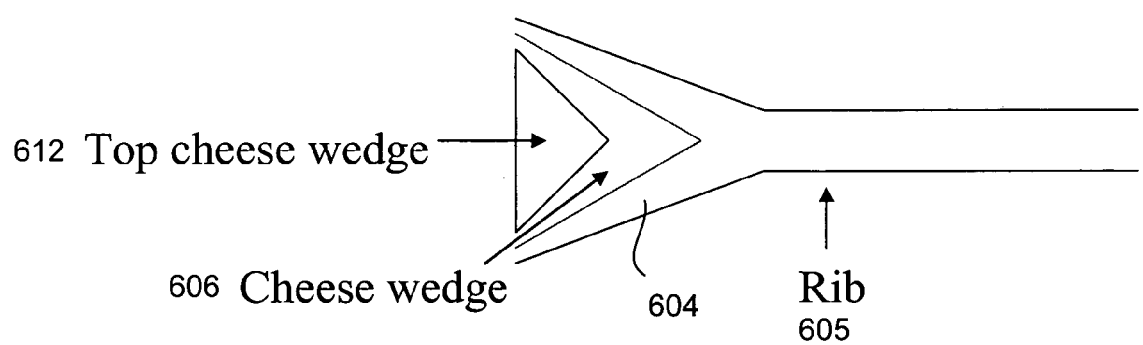
Fig. 7

DUAL "CHEESE WEDGE" SILICON TAPER WAVEGUIDE

FIELD OF THE INVENTION

Embodiments of the present invention relate to waveguides, and more particularly, to tapered optical waveguides.

BACKGROUND INFORMATION

Efficient light coupling between an optical fiber and a silicon waveguide is highly desired for silicon based photonic device and circuit applications. Due to the high refractive index contrast of silicon waveguide systems, obtaining good fiber-silicon waveguide coupling is very challenging particularly for small silicon rib waveguides.

Often is the case that an optical device includes a fiber or waveguide that is intended to be coupled to another waveguide having a significantly larger/smaller cross-sectional size. For example, a planar lightwave circuit (PLC) can have a waveguide on the order of four microns in height to be coupled to an optical fiber with a diameter of about ten microns. One way to couple a port of a relatively large waveguide to a port of a significantly smaller waveguide is by forming a tapered waveguide structure to couple the two waveguides.

In one type of taper, similar to that shown in U.S. Pat. No. 6,108,478 to Harpin et al., the taper at one end has a height or diameter of about the same size as a larger waveguide to which it is to be coupled. At the other end, the taper typically comes to a point. The sides of the taper are typically straight so that the taper has a wedge-like shape, with the wider part of the taper being at the end of the waveguide. This end of the taper is used to couple the taper to the larger waveguide. The interior end of the taper serves as a termination, which along with the narrowing shape of the taper helps force light to propagate from the wide end of the taper to the smaller waveguide (or from the smaller waveguide to the wide end of the taper).

FIG. 1 shows a tapered rib waveguide, sometimes referred to as a "cheese wedge" taper waveguide 100 similar to that shown in Harpin et al, mentioned above. The waveguide 100 may be formed on a silicon-on-insulator (SOI) substrate comprising an insulation layer 102 and a silicon layer 104. The waveguide 100 generally comprises a tapered section 106 and a final waveguide or rib section 108, shown divided by illustrative line 111. The tapered section 106 comprises a lower taper 110 and an upper, generally wedge shaped taper 112. The upper taper 112 and lower taper 110 include an input facet 114 which may be integrally formed. The lower taper 110 gradually tapers down over length "L" to match the size of an output waveguide 116 in section 108. The upper taper 112 may taper to a point 118 to be generally wedge shaped. This type of waveguide taper 100 may be used to provide high coupling efficiency (coupling loss <1 dB/facet) between a standard fiber (with a modal diameter of ~9 μm) coupled at the input facet 114 and silicon waveguide 116 with a width or height of ~4–5 μm.

As the refractive index contrast is larger for silicon waveguides as compared to optical fibers, a larger taper input facet 114 may be needed for better coupling. For example, as shown in FIG. 1, if a larger input facet 114 of 13×13 μm is called for, it may be difficult to obtain efficient coupling to waveguides 116 smaller than W×H=2.5×2.5 μm with a reasonable taper length (e.g., L=1–2 mm).

Referring to FIG. 2 there are shown modeling results for taper loss for a 2 mm long taper (L) for different final rib waveguide sizes (W) 116. The graph shows that the loss for the standard cheese wedge taper 100 increases with decreasing the final waveguide dimension. When the waveguide dimension W is smaller than 2.5×2.5 μm, the loss is larger than 1 dB/facet. Further, loss increases quickly with further decreasing the final waveguide 116 dimension. Since these small waveguides (1–2.5 μm) are often used for the high density silicon photonic integrated circuits and for better laser diode to silicon waveguide coupling, such losses may be unacceptable.

BRIEF DESCRIPTION OF THE DRAWINGS

FIGS. 6A, 6B, 6C, and 6D are diagrams illustrating one process for forming a dual cheese wedge taper waveguide;

FIG. 7 is a top view of a dual cheese wedge taper waveguide; and

DETAILED DESCRIPTION

In optical systems it may be challenging to efficiently couple light into and out of a chip. Particularly difficult may be the coupling of light from a standard optical fiber or external light source to a silicon waveguide owing to the differences in size, shape and refractive indices (n) between typical optical fibers and silicon waveguides. For example, a single-mode fiber core (n=1.5) usually has a diameter of 8 μm with a symmetric mode, while a silicon waveguide (n=3.5) is typically only a few micrometers in width with an asymmetric mode.

Figure 3:
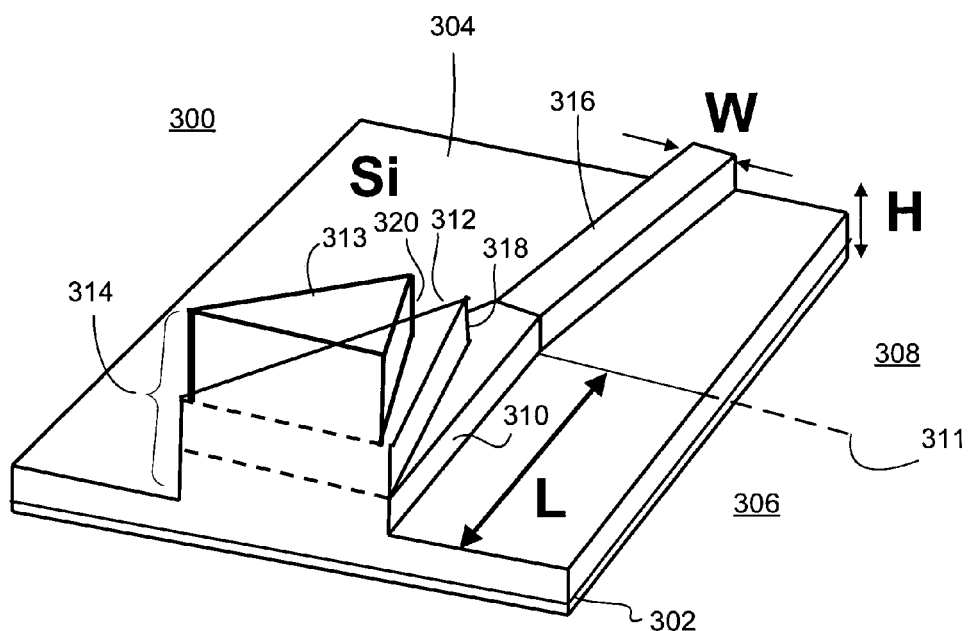
FIG. 3 is a plan view of a dual cheese wedge taper waveguide according to embodiments of the invention.

One method to address the aforementioned disparities may be to use a waveguide taper according to embodiments of the invention. Referring to FIG. 3, there is shown a plan view of a "dual cheese wedge" tapered waveguide 300. The waveguide 300 may be formed on a silicon-on-insulator (SOI) substrate comprising an insulator layer 302 and a silicon layer 304. The waveguide 300 generally comprises a tapered section 306 and an output waveguide section 308, shown divided by illustrative line 311. The tapered section 306 comprises a lower taper 310, a first, generally wedge shaped taper (first wedge) 312 on top of the lower taper 310, and a second generally wedge shaped taper (second wedge) 313 on top of the first wedge 312.

The lower taper 310, and the wedges 312 and 313, may be integrally formed and comprise an input/output facet 314 at one end. The lower taper 310 gradually tapers down over length "L" to match the size of an output waveguide rib 316 in section 308. The first wedge 312 may taper to a tip 318 to be generally wedge shaped. The second wedge 313 may be smaller than the first wedge 312 and also taper to a tip 320.

A top view of first wedge 312 may resemble an isosceles triangle having its lateral sides being generally equal lengths. Likewise, a top view of the second wedge 313 may also resemble an isosceles triangle having its lateral sides being generally equal lengths, typically shorter than the lateral sides of the first wedge 312. The base of the first wedge 312 and the base of the second wedge 313 may generally be as wide as the wide end of the lower taper 310 and arranged to form the input facet 314.

According to embodiments, the waveguide taper 300 may allow for a reduction in coupling loss through an adiabatic modal transformation and may also be used to increase the alignment tolerance of other optical devices, such as lasers. In operation, a light beam travels through the waveguide 300 entering at facet 314. The optical mode of the beam may be gradually squeezed from the second wedge 313 into the first wedge 312 and then into the lower taper 310 and into the output waveguide 316. Parameters for this transition include the length (L) of the taper (the longer the length L the more slowly the mode may be transformed resulting in lower loss) and the taper tip widths 318 and 320. In order to reduce optical losses associated with the finite size of the tip widths, the tips 318 and 320, shown axially aligned with the rib 316, may be designed such that the minimum width is smaller than the wavelength of light to be transmitted in the waveguide 300.

Figure 4:
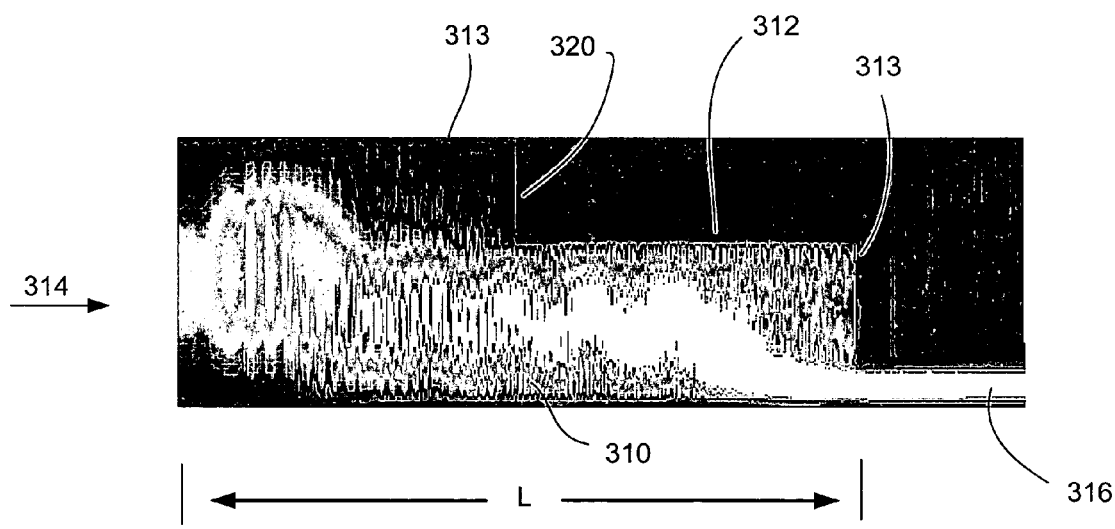
FIG. 4 is a simulation of light propagation through the dual cheese wedge taper shown in FIG. 3.

FIG. 4 shows a simulation of light propagation through the dual cheese wedge taper 300 shown in FIG. 3. In this particular simulation, the input facet 314 is 10×13 µm, the size of the final waveguide 316 is 1×1 µm (i.e. W=1 µm) and the width of the wedge tips 318 and 320 is 0.3 µm. As illustrated a light beam enters the input facet 314. Thereafter the beam may be gradually squeezed from the second wedge 313 into the first wedge 312 and then into the lower taper 310 and into the output waveguide 316. In this simulation, for a single mode fiber (SMF) to a 1×1 µm waveguide, the loss is shown to be only about 0.9 dB/facet. Without the taper 300 the coupling loss is shown to be about 14 dB/facet.

Figure 1:
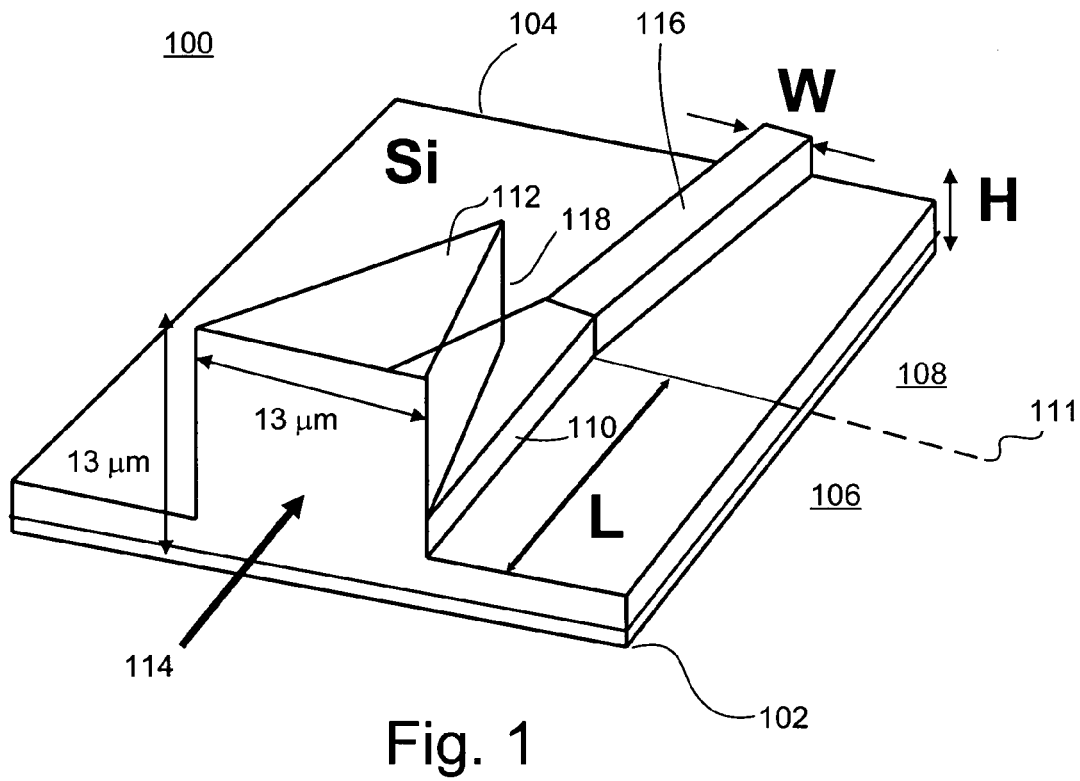
FIG. 1 is a plan view of a standard cheese wedge taper waveguide.
Figure 2:
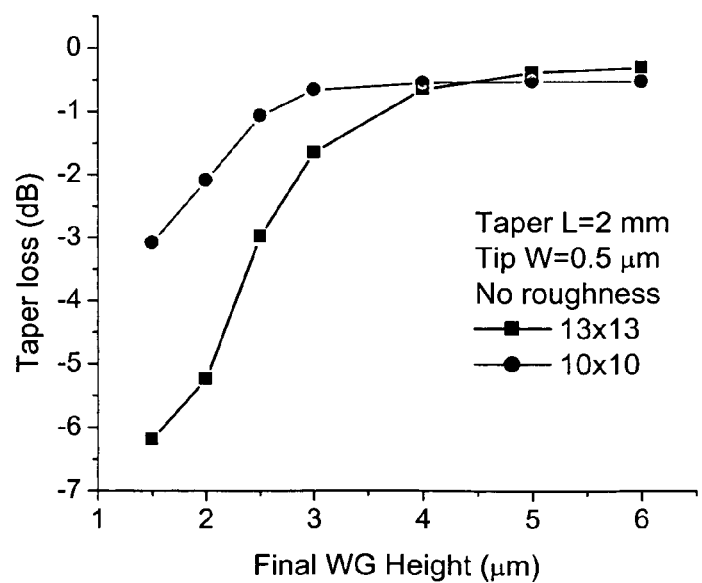
FIG. 2 is a graph illustrating taper loss for a 2 mm long taper for two different taper input cross section dimensions.
Figure 5:
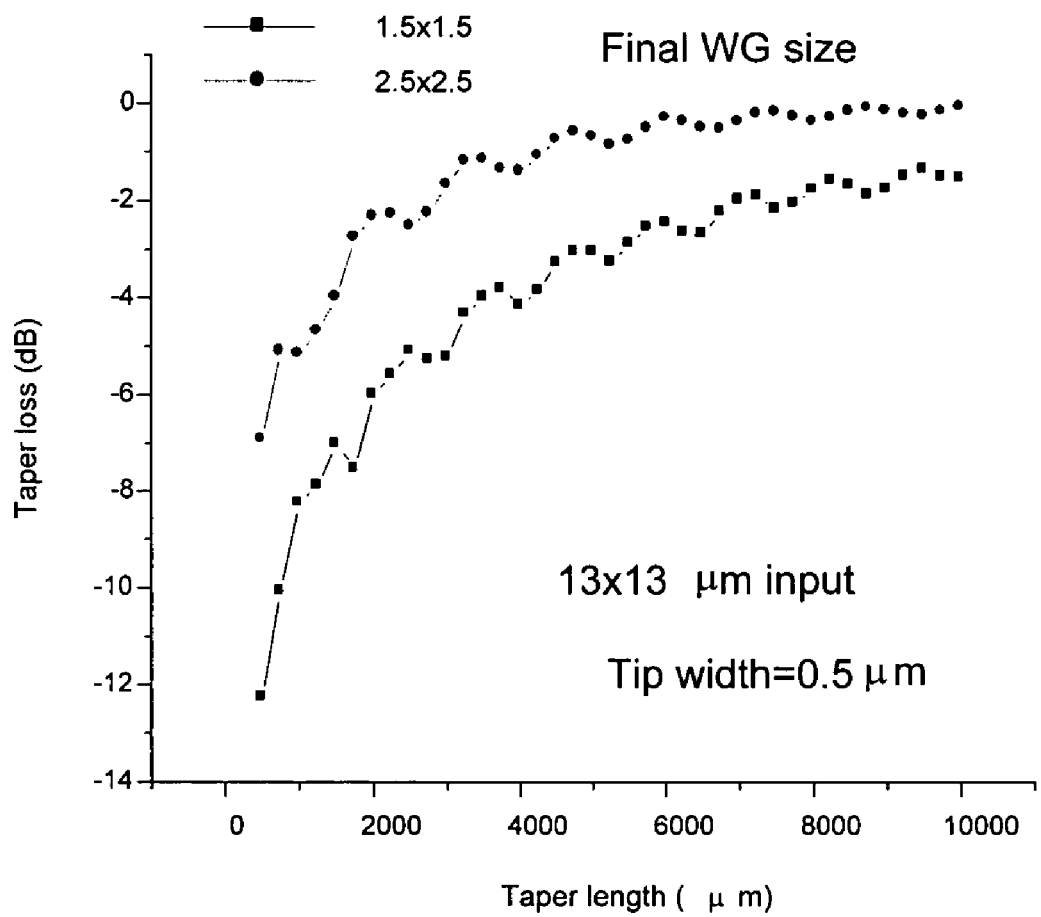
FIG. 5 is a graph comparing taper loss for various taper lengths.

Thus, according to embodiments of the invention, such low losses (e.g. 0.9 dB/facet) may be obtained with taper lengths (L) as short as 2 mm. The above results may not be attainable with a standard cheese wedge, such as that shown in FIG. 1 even when the taper length (L) is as long as 10 mm. FIG. 5 is a graph showing simulated loss for a standard cheese wedge taper with an input facet 114 sized at 13×13 µm, tip width (W) of 0.5 µm for final waveguide (WG) sizes of 1.5×1.5 µm and 2.5×2.5 µm. As shown, with the standard cheese wedge even if the taper length (L) is extended to 10 mm (10,000 µm) taper losses as low as 0.9 dB/facet may not be achieved for 1.5×1.5 µm final waveguides.

FIGS. 6A–6D illustrate a process for forming a dual cheese wedge taper according to embodiments of the invention. FIG. 6A shows a side view of a single cheese wedge taper including a silicon substrate 600 having an oxide layer 602. The lower taper 604 and final waveguide rib 605 may comprise a single silicon layer over the oxide 602. A fist wedge 606, also comprising silicon may be positioned over the lower taper 604.

In FIG. 6B, an oxide deposition layer 608 is formed over the rib waveguide 605 and the first wedge 606. The height of the oxide layer 608 over the first wedge may be roughly as high as the height of the first wedge 606. Thereafter, the oxide layer 608 may be polished to form a smooth top surface.

In FIG. 6C, the oxide is patterned such as with a mask (not shown) and a portion is etched 610 over the first wedge 606. Finally, in FIG. 6D silicon is regrown. This may be grown as a single crystal or may be poly-silicon to form the second wedge 612. Using silicon re-growth and etching may provide for better control of critical dimension (CD) in the final waveguide. Thereafter, the top surface may be polished and the oxide layer 608 removed.

FIG. 7 shows a top view of the dual cheese wedge taper waveguide according to embodiments of the invention. As illustrated, the first wedge 606 may be larger than the second wedge 612 positioned over top. The lower taper 604 may be larger yet and taper into the rib 605.

Figure 8:
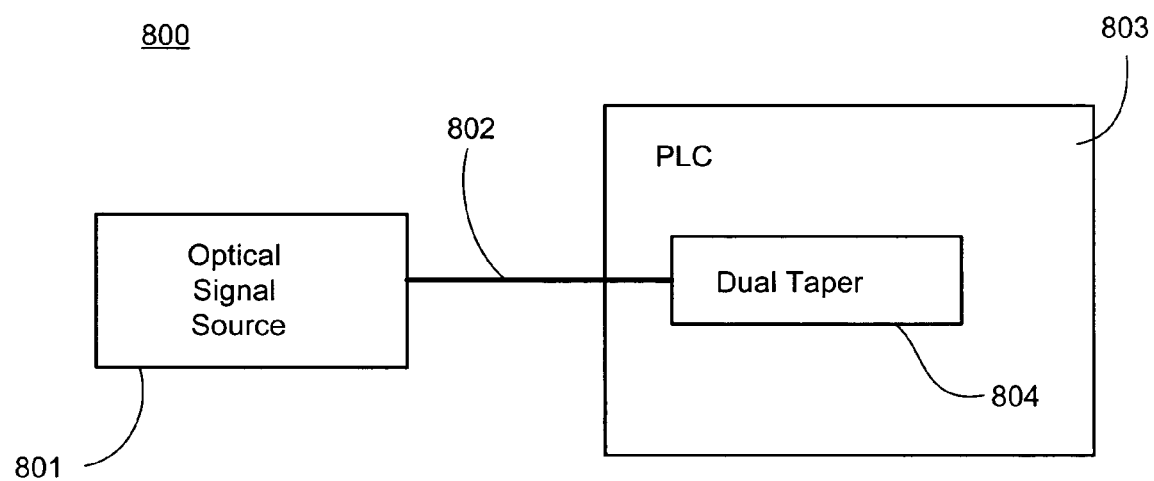
FIG. 8 is an exemplary system using the dual cheese wedge taper.

FIG. 8 illustrates a system 800 in which a waveguide taper 804 according to embodiments of the present invention can be used. System 800 includes an optical signal source 801 connected to one end of an optical fiber 802. The other end of optical fiber 802 is connected to a PLC 803 that includes a taper 804. Taper 804 may be fabricated according to one of the embodiments described above. For example, when the taper is implemented as shown in the embodiment of FIG. 7, the wide end of the taper 804 would be used to connect PLC 803 to the end of optical fiber 802. In one embodiment, PLC 803 may be implemented in an integrated circuit. Other embodiments may have one or more other tapers (not shown) that are similar in structure to taper 804.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description.

The terms used in the following claims should not be construed to limit the invention to the specific embodiments disclosed in the specification. Rather, the following claims are to be construed in accordance with established doctrines of claim interpretation.

What is claimed is:

1. An apparatus, comprising:
    a lower waveguide having a first end tapering down over length (L) to a narrower second end;
    a first generally wedge shaped waveguide atop the lower waveguide; and
    a second generally wedge shaped waveguide atop the first generally wedge shaped waveguide.

2. The apparatus as recited in claim 1, wherein the first end of the lower waveguide, a base side of the first generally wedge shaped waveguide, and a base side of the second generally wedge shaped waveguide are aligned to form an input/output facet.

3. The apparatus as recited in claim 1 wherein the first generally wedge shaped waveguide is smaller than the lower waveguide.

4. The apparatus as recited in claim 3 wherein the second generally wedge shaped waveguide is smaller than the first generally wedge shaped waveguide.

5. The apparatus as recited in claim 1 wherein the length (L) of the taper is less than 10 millimeters.

6. The apparatus as recited in claim 1 wherein the length (L) of the taper is approximately 2 millimeters.

7. A tapered waveguide device, comprising:
    a silicon-on-insulator substrate (SOI);
    a lower waveguide on the SOI substrate having a wider end tapering down to a narrower end;
    a first wedge shaped waveguide atop the lower waveguide; and
    a second wedge shaped waveguide atop the first wedge shaped waveguide, wherein the wider end of the lower waveguide and base ends of the first and second wedge shaped waveguides form an input/output facet.

8. A tapered rib waveguide device as recited in claim 7, further comprising:
a rib on the SOI substrate at the narrower end of the lower waveguide.

9. The tapered waveguide device as recited in claim 7, wherein a taper length of the lower waveguide is less than 10 millimeters.

10. The tapered waveguide device as recited in claim 8 wherein the rib is approximately 1 to 2.5 μm.

11. The tapered waveguide as recited in claim 7 wherein the first and second wedge shaped waveguides comprise isosceles triangular wedges each having a tip end axially aligned with the rib.

12. The tapered waveguide as recited in claim 11 wherein the tip ends each have a width of approximately 0.3–0.5 μm.

13. The tapered waveguide as recited in claim 7 wherein the second wedge shaped waveguide comprises one of regrown silicon and polysilicon.

14. A method comprising:
inputting a beam into a waveguide facet;
squeezing an optical mode of the beam from a top wedge into a lower wedge;
squeezing the optical mode of the beam from the lower wedge into a tapered waveguide; and
coupling the beam from the tapered waveguide to a rib.

15. The method as recited in claim 14, wherein the tapered waveguide comprises a taper length of approximately 2 mm.

16. The method as recited in claim 14 wherein the facet is about 10 to 13 μm wide and the rib is about 1 to 2.5 μm wide.

17. A system, comprising:
a dual wedge waveguide comprising:
a lower waveguide having a first end tapering down over length (L) to a narrower second end, the narrower end to connect to an optical circuit;
a first generally wedge shaped waveguide atop the lower waveguide; and
a second generally wedge shaped waveguide atop the first generally wedge shaped waveguide;
an optical signal source; and
an optical fiber to connect between the dual wedge waveguide and the optical signal source.

18. The system as recited in claim 17 wherein the optical circuit comprises a planar lightwave circuit (PLC).

19. The system as recited in claim 17 wherein the length (L) comprises less than 10 millimeters.

20. The system as recited in claim 17 wherein the first wedge shaped waveguide comprises one of regrown silicon and polysilicon.

* * * * *